United States Patent
Hirota et al.

(10) Patent No.: US 7,204,891 B2
(45) Date of Patent: *Apr. 17, 2007

(54) REMELTING OF RARE EARTH MAGNET SCRAP AND/OR SLUDGE, MAGNET-FORMING ALLOY, AND SINTERED RARE EARTH MAGNET

(75) Inventors: Koichi Hirota, Takefu (JP); Takehisa Minowa, Takefu (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/214,768

(22) Filed: Aug. 31, 2005

(65) Prior Publication Data

US 2006/0000522 A1    Jan. 5, 2006

Related U.S. Application Data

(63) Continuation of application No. 10/191,279, filed on Jul. 10, 2002, now Pat. No. 6,960,240.

(30) Foreign Application Priority Data

Jul. 10, 2001  (JP) .............................. 2001-209203
Jul. 10, 2001  (JP) .............................. 2001-209207

(51) Int. Cl.
*H01F 1/057*  (2006.01)
(52) U.S. Cl. .................... 148/103; 148/101; 419/12
(58) Field of Classification Search ...................... None
See application file for complete search history.

(56) References Cited

U.S. PATENT DOCUMENTS 4,601,875 A    7/1986  Yamamoto et al.
4,684,406 A    8/1987  Matsuura et al.
5,174,811 A    12/1992 Shmidt et al.
6,149,861 A    11/2000 Kaneko et al.

FOREIGN PATENT DOCUMENTS

| EP | 0 414 376 A2 | 2/1991 |
| JP | 6-136461 A | 5/1994 |
| JP | 8-31624 A | 2/1996 |
| JP | 9-217132 A | 8/1997 |
| JP | 2746818 B2 | 2/1998 |
| JP | 2765740 B2 | 4/1998 |
| JP | 2000-178666 A | 6/2000 |
| JP | 2001-335815 A | 12/2001 |
| JP | 2002-12921 A | 1/2002 |

OTHER PUBLICATIONS

ASM Handbook, vol. 7, Powder Metal Technologies and Applications, p. 1019, 1998.*
Derwent Publication Ltd., London, GB: AN 2001-071770 XP002221381, Oct. 11, 2000 *abstract*.

* cited by examiner

*Primary Examiner*—John P. Sheehan
(74) *Attorney, Agent, or Firm*—Birch, Stewart, Kolasch & Birch, LLP

(57) ABSTRACT

Rare earth magnet scrap and/or sludge is remelted for reuse. Once a rare earth-free magnet-constituent metal feed is loaded in a melting furnace and heated into a melt, a rare earth-containing metal feed and the rare earth magnet scrap and/or sludge are added to the melt, a particulate flux of an alkali metal, alkaline earth metal or rare earth metal halide and having an average particle size of 1–50 μm, preferably wrapped in a metal foil, is added to the melt, and the resulting mixture is melted, from which an alloy ingot is obtained. The valuable elements in the scrap and/or sludge can be recycled. Better separation between the slag and the molten metal ensures that the ingot is obtained from the melt in a high yield.

6 Claims, No Drawings

REMELTING OF RARE EARTH MAGNET SCRAP AND/OR SLUDGE, MAGNET-FORMING ALLOY, AND SINTERED RARE EARTH MAGNET

This application is a Continuation of Application Ser. No. 10/191,279 filed on Jul. 10, 2002, U.S. Pat. No. 6,960,240, and for which priority is claimed under 35 U.S.C. § 120; and this application claims priority of Application Nos. 2001-209203 and 2001-209207, filed in Japan on Jul. 10, 2001 under 35 U.S.C. § 119; the entire contents of all are hereby incorporated by reference.

This invention relates to a method of remelting rare earth magnet scrap and/or sludge for reuse as a melting feed, a rare earth alloy obtained by the method, and a sintered rare earth magnet.

BACKGROUND OF THE INVENTION

Rare earth magnets are used in a wide variety of applications including household electric appliances, large computer peripheral terminals, and medical equipment. They constitute a family of very important electronic materials, which is a key to the advanced technology. In compliance with the recent trend of reducing the size and weight of computers and communication equipment, efforts have also been made to develop rare earth magnets of reduced size and increased precision. Since rare earth magnets are expected to find further spreading applications, there will be a rapid increase of the demand for rare earth magnets.

Rare earth magnets are generally molded to a rough estimate size, sintered, machined and ground to the predetermined size, and surface finished into commercial articles as by plating or coating. These operations generate scraps including powder surplus upon molding, failed or defective articles associated with sintering, machining and plating, and under-performing articles, which amount to ten or more percents of the initial weight of raw material. The machining and grinding operations generate sludge or swarf including machined chips, waste and dust, which also amount to several ten percents of the initial weight of raw material. From the standpoints of saving the resource, reducing industrial wastes, and reducing the cost of rare earth magnets, it is very important to recover rare earth elements from the rare earth magnet scrap and sludge for reuse.

In the rare earth magnet manufacturing process, it is almost unavoidable that gaseous impurities such as oxygen and carbon are introduced into rare earth magnets. The sludge includes fine particles of the magnet composition and rare earth oxides, which are likely to oxidize due to their high activity. Since an organic solvent included in a coolant fluid used in the machining operation sticks to sludge surfaces, the sludge has a concentration of carbon, nitrogen and hydrogen, which is several hundred to thousand times higher than that of normal alloy powder.

In general, rare earth has a very high affinity to gaseous components such as oxygen and carbon, which impedes the removal of such gaseous components. It is thus deemed very difficult to recover rare earth elements from the rare earth magnet scrap and sludge for reuse.

Heretofore, several methods have been proposed for the reclamation of rare earth magnet scrap or sludge. Depending on the reclamation or reuse form of rare earth element, these methods are divided into three classes, (1) rare earth recovery, (2) alloy reclamation and (3) magnet reclamation.

The rare earth recovery method is to recover only rare earth elements from magnet scrap or sludge as rare earth compounds, which are recycled to the raw material stage. More specifically, the scrap is dissolved using an acid, after which the solution is chemically treated to recover rare earth elements as fluorides or oxides. This is followed by calcium reduction or molten salt electrolysis, thereby obtaining rare earth metals. For example, Japanese Patent No. 2,765,740 discloses a method for separating and recovering rare earth elements by dissolving rare earth magnet scrap in an aqueous nitric acid/sulfuric acid solution, and adding an alcohol to the solution whereupon crystallized rare earth sulfate is selectively precipitated out. JP-A 9-217132 discloses a method for separating and recovering rare earth compounds and cobalt by adding nitric acid to a slurry of a cobalt-containing rare earth-iron base alloy, and adding oxalic acid or fluoride to the solution containing cobalt and rare earth elements. These methods have the advantages that a large quantity of scrap or sludge can be treated at a time and rare earth compounds of high purity can be recovered, but suffer from several problems including use of a large volume of acid, difficult disposal of used acid and complex steps.

The alloy reclamation method is characterized in that the magnet scrap or sludge is recovered as an alloy of the same composition. The scrap is melted by high frequency melting, arc melting or plasma melting, obtaining a magnet alloy. For example, in JP-A 8-31624, rare earth magnet scrap is melted together with a magnet raw material by high-frequency melting whereby the scrap is reclaimed as a magnet alloy. JP-A 6-136461 utilizes a zone melting technique to separate a rare earth magnet scrap into an alloy and slag. These methods have the advantages that by reclaiming the scrap as a magnet alloy, the smelting step of obtaining a rare earth-containing alloy and the melting step of obtaining a magnet alloy are shortened, and the expensive transition metals which are included in the magnet scrap along with the rare earth elements can also be recovered. Undesirably, the percent recovery of rare earth elements is low, and the crucible material can be eroded away and introduced into the ingot as foreign matter.

In contrast, the magnet reclamation method is to reclaim the scrap or sludge as a magnet. For example, Japanese Patent No. 2,746,818 discloses a method of obtaining a magnet by grinding magnet scrap, admixing it with a predetermined proportion of a rare earth-rich alloy powder, compacting the mixture and sintering. In the method of this patent, solid scrap and rare earth alloy are loaded together in a crucible, before they are heated and melted in a high-frequency melting furnace whereby a magnet-forming alloy is reclaimed. This method is economically advantageous because the existing magnet manufacturing apparatus can be utilized and not only rare earth elements, but also expensive transition metals can be recovered and recycled. It is also contemplated that about 10% by weight based on the melting feeds of a rare earth alloy is melted together in order to prevent erosion of the crucible material, and a flux is added in order to reduce the amount of slag generated which is believed to cause erosion of the crucible material.

However, since the scrap accounts for 90% of the melting feeds, the percent yield of this method is very low when no flux is added. This requires that the flux be added in an amount as large as 40% of the melting feeds. The flux causes the crucible to be eroded so that the crucible material is introduced into the ingot, exacerbating the magnetic properties and surface treatment amenability of the alloy ingot. There also arise issues including a reduced recovery rate of rare earth and an increased cost of operation.

During the magnet manufacturing process, 0.05 to 0.8% by weight of oxygen is inevitably introduced in the solid scrap. If the solid scrap alone is remelted in a high-frequency-melting furnace, the rare earth elements instantaneously form oxides to reduce the recovery rate of rare earth from the solid scrap. Furthermore, the rare earth oxides thus formed are dispersed throughout the molten metal and interconnected in a network form so that the molten metal resides in the network of oxide, resulting in poor separation between the molten metal and the slag and a reduced recovery rate of the ingot.

It is noted that when feed materials of low quality such as scrap are melted, more slag generates. Due to the very poor separation of the thus generated slag and the molten metal, a substantial portion of sound molten metal is entrained in the slag and left in the crucible, leading to a lowering of the recovery rate of the ingot. To solve the above problems, several methods have been proposed.

One exemplary method of preparation of a high purity rare earth metal is a defluorinating method involving heating and melting a rare earth metal and a fluoride thereof together, removing oxygen therefrom, and remelting in high vacuum. Since a large amount of fluoride is added, a crucible made of tantalum or analogous metal must be used in order to avoid erosion of the crucible. To remove the fluorine introduced as the impurity, remelting operation is necessary.

In the above-described method of preparing a magnet-forming alloy by charging a crucible with magnet scrap together with a rare earth alloy, heating and melting them, and then adding a flux and scrap, the amount of the flux added is as large as 40% of the melting feeds, with a likelihood that unmelted flux can be left and carried into the ingot. Further, during vacuum pumping and flux addition, the flux will scatter and be incorporated into the ingot, exacerbating the magnetic properties and surface treatment amenability of the resulting magnet.

SUMMARY OF THE INVENTION

An object of the present invention is to provide a method of remelting rare earth magnet scrap and/or sludge for reuse as melting feed such that the rare earth may be recovered at a high efficiency and in an increased yield, as well as a rare earth alloy obtained by the method, and a sintered rare earth magnet.

Another object of the present invention is to provide a method of remelting rare earth magnet scrap and/or sludge by melting it as a part of melting feed and adding a flux thereto in a melting furnace in such a manner as to suppress the scattering of the flux and minimize the contamination of the melting furnace, thereby obtaining a magnet-forming alloy of high purity, as well as a rare earth alloy obtained by the method, and a sintered rare earth magnet.

The present invention is directed to a R—Fe—B base rare earth magnet wherein R is a rare earth element inclusive of yttrium, and preferably at least one rare earth element selected from among Pr, Nd, Tb, and Dy. It has been found that when a method of remelting R—Fe—B base rare earth magnet scrap and/or sludge is carried out by charging a melting furnace crucible with a rare earth-free metal feed for R—Fe—B base magnet, heating the metal feed for melting into a melt, and adding to the melt a rare earth-containing metal feed and the R—Fe—B base rare earth magnet scrap and/or sludge and a flux containing a halide of an alkali metal, alkaline earth metal or rare earth metal, the rare earth element can be recovered at a high efficiency and the melting yield is improved.

It has also been found that when a method of remelting rare earth magnet scrap and/or sludge is carried out by wrapping a particulate flux containing a halide of an alkali metal, alkaline earth metal or rare earth metal and having an average particle size of 1 to 50 μm, within a magnet-constituent metal, and adding the metal wrapped flux to a molten metal containing the rare earth magnet scrap and/or sludge, a magnet-forming alloy of high purity can be prepared while suppressing the scattering of the flux and minimizing the contamination of the melting furnace.

In a first embodiment, the invention provides a method of remelting R—Fe—B base rare earth magnet scrap and/or sludge wherein R is a rare earth element inclusive of yttrium for reuse as melting feed, said method comprising the steps of charging a melting furnace crucible with a rare earth-free magnet-constituent metal feed; heating the metal feed for melting into a melt; adding to the melt a rare earth-containing metal feed and 0.1 to 50% by weight based on the metal feeds of the R—Fe—B base rare earth magnet scrap and/or sludge; further adding 0.01 to 30% by weight based on the metal feeds of a particulate flux containing a halide of at least one metal selected from among alkali metals, alkaline earth metals and rare earth metals and having an average particle size of 1 to 50 μm; and melting the resulting mixture.

In a second embodiment, the invention provides a method of remelting R—Fe—B base rare earth magnet scrap and/or sludge wherein R is a rare earth element inclusive of yttrium for reuse as melting feed, said method comprising the steps of wrapping a particulate flux containing a halide of at least one metal selected from among alkali metals, alkaline earth metals and rare earth metals and having an average particle size of 1 to 50 μm, within a magnet-constituent metal; and adding the metal wrapped flux to a molten metal containing the rare earth magnet scrap and/or sludge. Preferably the method further includes the steps of charging a melting furnace crucible with a rare earth-free magnet-constituent metal feed; heating the metal feed for melting into a melt; adding to the melt a rare earth-containing metal feed and 0.1 to 50% by weight based on the metal feeds of the R—Fe—B base rare earth magnet scrap and/or sludge; further adding 0.01 to 30% by weight based on the metal feeds of the metal wrapped flux; and melting the resulting mixture.

In either embodiment, R is typically at least one rare earth element selected from among Pr, Nd, Tb and Dy.

Also contemplated herein are an R—Fe—B base rare earth alloy obtained by either of the above methods and a sintered R—Fe—B base rare earth magnet obtained by sintering the rare earth alloy.

DESCRIPTION OF THE PREFERRED EMBODIMENTS

The present invention is generally directed to rare earth magnets, and specifically R—T—B base rare earth magnets wherein R is a rare earth element inclusive of yttrium, and preferably at least one rare earth element selected from among Pr, Nd, Tb, and Dy, and T is Fe or a mixture of Fe and another transition metal.

In the method of remelting rare earth magnet scrap and/or sludge according to the invention, the scrap and sludge (referred to as "solid scrap," hereinafter) include such scrap as powder surplus upon molding, failed or defective articles associated with sintering, machining and plating, and under-performing articles, and sludge or swarf such as chips, waste and dust arising from machining and grinding steps. The solid scrap mainly contains a phase of the R—T—B composition. The solid scrap has a composition approximate to that of a melting ingot, but additionally contains oxygen, carbon and nitrogen as incidental impurities introduced in the magnet manufacturing process, often in an amount of 0.05–0.8%, 0.03–0.1% and 0.002–0.02% by weight, respectively.

In the first embodiment of the present invention, an R—Fe—B base magnet-forming alloy is obtained by remelting the solid scrap. First, a rare earth-free magnet-constituent metal feed, a rare earth-containing metal feed, and the solid scrap are furnished so that the resulting magnet-forming alloy may have the desired composition. The rare earth-free magnet-constituent metal feed is previously melted in a melting furnace crucible. The rare earth-containing metal feed and the solid scrap are added to the melt and melted together. The rare earth-free metal feeds used herein include electrolytic iron, ferroboron, cobalt, aluminum and the like. The rare earth-containing metal feeds used herein include Nd, Dy, Nd—Fe, Dy—Fe, and the like.

Again in the second embodiment, preferably the rare earth-free magnet-constituent metal feed is melted under an inert atmosphere at 1,500° C. or higher and preferably 1,500 to 1,800° C., and the rare earth-containing metal feed and the solid scrap are fed to the melt and melted together, although the order of adding and melting the metal feeds may be selected as appropriate.

In either embodiment, a flux is added to the melt to which the solid scrap has been added. The flux is preferably a halide of a magnet-constituent element or one or more halides of alkali metals, alkaline earth metals and rare earth metals. The halides used herein include chlorides, fluorides, bromides and iodides, with the fluorides being preferred. Exemplary halides include $NdF_3$, $PrF_3$, $DyF_3$, $TbF_3$, $MgF_2$, $CaF_2$, $BaF_2$, LiF, NaF, KF, $NdCl_3$, $PrCl_3$, $DyCl_3$, $TbCl_3$, $MgCl_2$, $CaCl_2$, $BaCl_2$, LiCl, NaCl, KCl, $NdBr_3$, $PrBr_3$, $DyBr_3$, $TbBr_3$, $NdI_3$, $PrI_3$, $DyI_3$, $TbI_3$, and mixtures of two or more of these.

The amount of the flux added is 0.01 to 30% by weight, and preferably 0.05 to 10% by weight based on the total weight of the metal feeds (the rare earth-free magnet-constituent metal feed and the rare earth-containing metal feed). Addition of less than 0.01 wt % of the flux fails to achieve the desired effects. If the addition amount exceeds 30 wt %, the excess of flux can react with the crucible material to erode the crucible interior wall. If such excess flux is incorporated into the ingot, it adversely affects the magnetic properties and surface treatment amenability of sintered magnets.

To minimize the migration of rare earth elements to the slag phase and the evaporation loss of rare earth elements by heat melting, it is recommended that once the metal feeds excluding rare earth are heat melted under an inert atmosphere at 1,500° C. or above and preferably 1,500 to 1,800° C., the solid scrap is added together with the rare earth-containing metal feed and the flux whereupon they are heat melted at 1,500° C. or above and preferably 1,500 to 1,800° C. again. In particular, dysprosium, which is resourceless and expensive among the rare earth elements, tends to form a stable oxide and migrate into the slag phase and experiences a substantial loss upon heat melting due to its high vapor pressure. Then, by post adding the solid scrap to the melt together with the rare earth feed, the loss of rare earth elements in the scrap is minimized.

Together with the rare earth-containing metal feed and the flux, the solid scrap may be added in an amount of 0.1 to 50% by weight and preferably 0.5 to 30% by weight, based on the total weight of the metal feeds. If the amount of the solid scrap admitted exceeds 50 wt %, the yield of the resulting ingot is reduced.

As mentioned above, the flux is added to the molten metal containing the solid scrap. The second embodiment of the present invention pertains to the way of adding the flux. Specifically, the particulate flux is wrapped with a metal, preferably a metal foil formed of a magnet-constituent metal such as Al, Fe or Cu, and the wrapped flux is added to the molten metal. If the metal is not used, the particulate flux may scatter within the melting furnace and contaminate the furnace interior and the ingot. If the particulate flux is wrapped with a metal other than the magnet constituent, that metal is introduced into the alloy as an impurity so that the alloy composition becomes unstable. Further, the foreign metal can adversely affect the magnetic properties of the magnet resulting from the alloy. The metal foil preferably has a gage in the range of 0.1 to 100 μm, but is not limited thereto.

The flux used herein is a halide of one or more metals selected from among alkali metals, alkaline earth metals and rare earth metals as described above. Of these, the halides, especially fluorides, of rare earth elements are preferred. The flux is preferably added in an amount of 0.01 to 30% by weight and more preferably 0.05 to 10% by weight, based on the weight of the overall molten metal.

The flux used herein should preferably have an average particle size of 1 to 50 μm, and more preferably 5 to 20 μm and is preferably in powder form. If the flux has an average particle size of less than 1 μm, it undesirably scatters during its addition and during vacuum pumping of the furnace and thus contaminates the furnace chamber and the ingot formed therein. If the flux has an average particle size of more than 50 μm, such large particles are not completely melted so that unmelted flux accumulating on the crucible inner wall can be carried into the molten metal. The flux introduced into the ingot as an impurity can adversely affect the magnetic properties and surface treatment amenability of the resulting magnet.

In the second embodiment of the present invention, alloy-forming feeds such as rare earth elements, electrolytic iron, cobalt and other elements are melted in an inert atmosphere by high-frequency induction heating at 1,500° C. or higher and preferably 1,500 to 1,800° C. While the molten state is kept, a desired amount of the rare earth magnet scrap and/or sludge is added to the melt, and at the same time, a wrap of the particulate flux having an average particle size of 1 to 50 μm in the metal foil is added to the melt. The contents are heat melted at 1,500° C. or higher and preferably 1,500 to 1,800° C. again. The melt is then cast into a mold or the like to form an alloy ingot. The wrap of the flux prevents the flux from scattering away during melting and restrains introduction of fluorine into the alloy.

The alloy composition obtained according to the invention is a rare earth magnet-forming alloy and preferably $R_2Fe_{14}B$ base magnet-forming alloy. The preferred composition is a $R_2Fe_{14}B$ base alloy composition containing 27 to 33% by weight of the alloy of R which is a rare earth element inclusive of yttrium, and preferably at least one rare earth element selected from among Pr, Nd, Tb and Dy, up to 6% by weight of boron, and the balance of iron or a mixture of iron and another transition metal which is preferably selected from among Co, Cu, Al, Ti, Si, V, Mn, Ni, Nb, Zr, Ta, Cr, Mo and Hf, and mixtures thereof. When an alloy composition within this range is to be produced, the metal within which the flux is wrapped is a metal selected from that alloy composition. Specifically, a metal foil is preferably used. The foil is preferably of one or more metals selected from among Al, Fe, Cu and alloys thereof.

By processing the alloy ingot thus obtained in a conventional manner, a sintered rare earth magnet is produced. Specifically, the alloy ingot is mechanically crushed by a Brown mill or the like, and comminuted to an average particle size of 3–10 µm with the aid of an inert gas such as nitrogen or argon gas (by a jet mill or similar means). The alloy powder is then compacted in a magnetic field, sintered in vacuum or in an inert gas (ex., Ar) atmosphere at a temperature of 1,000 to 1,200° C., and optionally, aged in vacuum or in an inert gas (ex., Ar) atmosphere at a temperature of 400 to 600° C.

EXAMPLE

Examples of the invention are given below by way of illustration and not by way of limitation. All percents are by weight unless otherwise stated.

Example 1

The starting feeds used were Nd, Dy, electrolytic iron, Co, ferroboron, Al and rare earth magnet scrap (30Nd—3Dy—bal.Fe—3.5Co—1.1B—0.2Al). Amounts of these feeds were determined so as to provide a composition of 26Nd—1.5Dy—bal.Fe—1Co—1.1B—0.2Al as expressed in % by weight.

First, the electrolytic iron, Co, ferroboron and Al feeds were admitted into a high-frequency melting furnace crucible where they were melted in an Ar atmosphere by high-frequency induction heating. After it was confirmed that the molten metal reached a temperature of 1,500° C. or above, the Nd and Dy feeds were added along with 5% of the rare earth magnet scrap. At the same time, 10% of NdF$_3$ (average particle size 5 µm) was added as the flux. After the addition, the contents were allowed to stand for several minutes. After it was confirmed that the molten metal reached a temperature of 1,500° C. or above again, the molten metal was cast into a copper mold, obtaining a magnet-forming alloy ingot. The results of melting are shown in Table 1. The yield of melting was 99.1%. The ingot had a composition substantially equal to that of the mixed feeds and had a fluoride concentration of less than 100 ppm.

TABLE 1

| Scrap added (%) | Flux added (%) | Yield (%) | Nd (%) | Dy (%) | Al (%) | F (ppm) |
|---|---|---|---|---|---|---|
| 0.0 | 0 | 99.2 | 25.9 | 1.49 | 0.22 | <100 |
| 5.0 | 10 | 99.1 | 25.8 | 1.50 | 0.22 | <100 |

The ingot was crushed and comminuted by means of a jet mill with a nitrogen stream, obtaining a fine powder having an average particle size of about 3 µm. The powder was then admitted into a mold of a compacting machine, oriented in a magnetic field of 12 kOe, and compacted under a pressure of 1 ton/cm$^2$ in a direction perpendicular to the magnetic field. The compact thus obtained was fired at 1,100° C. for 2 hours in an Ar atmosphere, cooled, and heat treated at 500° C. for one hour in an Ar atmosphere, completing a permanent magnet block. The sintered magnet was measured for magnetic properties, finding equivalent properties to those of a sintered magnet of the same composition to which rare earth magnet scrap had not been added (see Table 2).

The sintered magnet was shaped and cut to a desired shape and plated with Ni. It was subjected to a corrosion resistance test, finding no significant influence on its properties.

TABLE 2

| Scrap added (%) | Flux added (%) | ρ (g/cm$^3$) | Br (kG) | iHc (kOe) | (BH)max (MGOe) |
|---|---|---|---|---|---|
| 0.0 | 0 | 7.49 | 13.45 | 12.5 | 43 |
| 5.0 | 10 | 7.50 | 13.48 | 12.4 | 43 |

Comparative Example 1

The starting feeds used were Nd, Dy, electrolytic iron, Co, ferroboron, Al and rare earth magnet scrap (30Nd—3Dy—bal.Fe—3.5Co—1.1B—0.2Al). Amounts of these feeds were determined so as to provide a composition of 26Nd—1.5Dy—bal.Fe—1Co—1.1B—0.2Al as expressed in % by weight.

First, the electrolytic iron, Co, ferroboron and Al feeds were admitted into a high-frequency melting furnace crucible where they were melted in an Ar atmosphere by high-frequency induction heating. After it was confirmed that the molten metal reached a temperature of 1,500° C. or above, the Nd and Dy feeds were added along with 25% of the rare earth magnet scrap. After the addition, the contents were allowed to stand for several minutes. After it was confirmed that the molten metal reached a temperature of 1,500° C. or above again, the molten metal was cast into a copper mold, obtaining a magnet-forming alloy ingot. The recovery rate of the ingot was 86.5%.

Comparative Example 2

The starting feeds used were Nd, Dy, electrolytic iron, Co, ferroboron, Al and rare earth magnet scrap (30Nd—3Dy—bal.Fe—3.5Co—1.1B—0.2Al). Amounts of these feeds were determined so as to provide a composition of 26Nd—1.5Dy—bal.Fe—1Co—1.1B—0.2Al as expressed in % by weight.

First, the electrolytic iron, Co, ferroboron and Al feeds and 5% of the rare earth magnet scrap were admitted into a high-frequency melting furnace crucible where they were melted in an Ar atmosphere by high-frequency induction heating. After it was confirmed that the molten metal reached a temperature of 1,500° C. or above, the Nd and Dy feeds were added. At the same time, 10% of NdF$_3$ (average particle size 5 µm) was added as the flux. After the addition, the contents were allowed to stand for several minutes. After it was confirmed that the molten metal reached a temperature of 1,500° C. or above again, the molten metal was cast into a copper mold, obtaining a magnet-forming alloy ingot. The results of melting are shown in Table 3. The yield of melting was 98.5%. The ingot had a composition in which the Dy concentration was about 0.2% lower than that of the mixed feeds and had a fluoride concentration of less than 100 ppm.

TABLE 3

| Scrap added (%) | Flux added (%) | Yield (%) | Nd (%) | Dy (%) | Al (%) | F (ppm) |
|---|---|---|---|---|---|---|
| 5.0 | 10 | 98.5 | 25.8 | 1.31 | 0.22 | <100 |

Comparative Example 3

The starting feeds used were Nd, Dy, electrolytic iron, Co, ferroboron, Al and rare earth magnet scrap (30Nd—3Dy— bal.Fe—3.5Co—1.1B—0.2Al). Amounts of these feeds were determined so as to provide a composition of 26Nd—1.5Dy—bal.Fe—1Co—1.1B—0.2Al as expressed in % by weight.

First, the electrolytic iron, Co, ferroboron and Al feeds were admitted into a high-frequency melting furnace crucible where they were melted in an Ar atmosphere by high-frequency induction heating. After it was confirmed that the molten metal reached a temperature of 1,500° C. or above, the Nd and Dy metal feeds were added along with 5% of the rare earth magnet scrap. At the same time, 40% of NdF$_3$ (average particle size 5 μm) was added as the flux. After the addition, the contents were allowed to stand for several minutes. After it was confirmed that the molten metal reached a temperature of 1,500° C. or above again, the molten metal was cast into a copper mold, obtaining a magnet-forming alloy ingot. The results of melting are shown in Table 4. The yield of melting was 99.0%. The ingot had a composition substantially equal to that of the mixed feeds and had a fluoride concentration of 5320 ppm.

TABLE 4

| Scrap added (%) | Flux added (%) | Yield (%) | Nd (%) | Dy (%) | Al (%) | F (ppm) |
|---|---|---|---|---|---|---|
| 5.0 | 40 | 99.0 | 25.8 | 1.48 | 0.21 | 5320 |

The ingot was crushed and comminuted by means of a jet mill with a nitrogen stream, obtaining a fine powder having an average particle size of about 3 μm. The powder was then admitted into a mold of a compacting machine, oriented in a magnetic field of 12 kOe, and compacted under a pressure of 1 ton/cm$^2$ in a direction perpendicular to the magnetic field. The compact thus obtained was fired at 1,100° C. for 2 hours in an Ar atmosphere, cooled, and heat treated at 500° C. for one hour in an Ar atmosphere, completing a permanent magnet block. The sintered magnet was measured for magnetic properties, finding that remanence and coercive force were low as compared with a sintered magnet of the same composition to which rare earth magnet scrap had not been added (see Table 5).

The sintered magnet was shaped and cut to a desired shape and plated with Ni. It was subjected to a corrosion resistance test. Much rust generated as compared with the sintered magnet of the same composition to which rare earth magnet scrap had not been added.

TABLE 5

| Scrap added (%) | Flux added (%) | ρ (g/cm$^3$) | Br (kG) | iHc (kOe) | (BH)max (MGOe) |
|---|---|---|---|---|---|
| 5.0 | 40 | 7.50 | 13.25 | 10.9 | 41 |

Example 2

The starting feeds used were Nd, Dy, electrolytic iron, Co, ferroboron, Al and rare earth magnet scrap (30Nd—3Dy—bal.Fe—3.5Co—1.1B—0.2Al). Amounts of these feeds were determined so as to provide a composition of 26Nd—1.5Dy—bal.Fe—1Co—1.1B—0.2Al as expressed in % by weight.

First, the electrolytic iron, Co and ferroboron feeds were admitted into a high-frequency melting furnace crucible (made of alumina) where they were melted in an Ar atmosphere by high-frequency induction heating. After it was confirmed that the molten metal reached a temperature of 1,500° C. or above, the Nd and Dy feeds were added along with 5% of the rare earth magnet scrap. At the same time, a wrap containing 5% of NdF$_3$ powder (average particle size 5 μm) in the Al foil (gage 15 μm) was added as the flux. After the addition, the contents were allowed to stand for several minutes. After it was confirmed that the molten metal reached a temperature of 1,500° C. or above again, the molten metal was cast into a copper mold, obtaining a magnet-forming alloy ingot. The results of melting are shown in Table 6. The ingot had a composition substantially equal to that of the mixed feeds. The presence of the flux as an impurity was not ascertained. No erosion of the crucible interior wall was ascertained.

TABLE 6

| Scrap added (%) | Flux's average particle size (μm) | Yield (%) | Nd (%) | Dy (%) | Al (%) | F (ppm) |
|---|---|---|---|---|---|---|
| 5.0 | 5 | 99.1 | 25.8 | 1.50 | 0.22 | <100 |

The ingot was crushed and comminuted by means of a jet mill with a nitrogen stream, obtaining a fine powder having an average particle size of about 3 μm. The powder was then admitted into a mold of a compacting machine, oriented in a magnetic field of 12 kOe, and compacted under a pressure of 1 ton/cm$^2$ in a direction perpendicular to the magnetic field. The compact thus obtained was fired at 1,100° C. for 2 hours in an Ar atmosphere, cooled, and heat treated at 500° C. for one hour in an Ar atmosphere, completing a permanent magnet material. The sintered magnet had satisfactory magnetic properties (see Table 7).

The sintered magnet was shaped and cut to a desired shape and plated with Ni. It was subjected to a corrosion resistance test, finding no significant influence on its properties.

TABLE 7

| ρ (g/cm$^3$) | Br (kG) | iHc (kOe) | (BH)max (MGOe) |
|---|---|---|---|
| 7.50 | 13.48 | 12.4 | 43 |

Comparative Example 4

The starting feeds used were Nd, Dy, electrolytic iron, Co, ferroboron, Al and rare earth magnet scrap (30Nd—3Dy—bal.Fe—3.5Co—1.1B—0.2Al). Amounts of these feeds were determined so as to provide a composition of 26Nd—1.5Dy—bal.Fe—1Co—1.1B—0.2Al as expressed in % by weight.

First, the electrolytic iron, Co and ferroboron feeds were admitted into a high-frequency melting furnace crucible (made of alumina) where they were melted in an Ar atmosphere by high-frequency induction heating. After it was confirmed that the molten metal reached a temperature of 1,500° C. or above, the Nd and Dy feeds were added along with 5% of the rare earth magnet scrap. At the same time, a wrap containing 10% of NdF$_3$ powder (average particle size 5 μm) in the Al foil was added as the flux. After the addition, the contents were allowed to stand for several minutes. After it was confirmed that the molten metal reached a temperature of 1,500° C. or above again, the molten metal was cast into a copper mold, obtaining a magnet-forming alloy ingot.

The results of melting are shown in Table 8. The yield of melting was 95.2%. The concentration of fluoride impurity remained substantially unchanged. At the end of melting, scattered NdF$_3$ particles accumulating on the furnace wall were found.

TABLE 8

| Scrap added (%) | Flux's average particle size (μm) | Yield (%) | Nd (%) | Dy (%) | Al (%) | F (ppm) |
|---|---|---|---|---|---|---|
| 5.0 | 0.5 | 95.2 | 25.6 | 1.41 | 0.25 | 100 |

Comparative Example 5

The starting feeds used were Nd, Dy, electrolytic iron, Co, ferroboron, Al and rare earth magnet scrap (30Nd—3Dy—bal.Fe—3.5Co—1.1B—0.2Al). Amounts of these feeds were determined so as to provide a composition of 26Nd—1.5Dy—bal.Fe—1Co—1.1B—0.2Al as expressed in % by weight.

First, the electrolytic iron, Co and ferroboron feeds were admitted into a high-frequency melting furnace crucible (made of alumina) where they were melted in an Ar atmosphere by high-frequency induction heating. After it was confirmed that the molten metal reached a temperature of 1,500° C. or above, the Nd and Dy feeds were added along with 5% of the rare earth magnet scrap. At the same time, a wrap containing 10% of NdF$_3$ powder (average particle size 500 μm) in the Al foil was added as the flux. After the addition, the contents were allowed to stand for several minutes. After it was confirmed that the molten metal reached a temperature of 1,500° C. or above again, the molten metal was cast into a copper mold, obtaining a magnet-forming alloy ingot. The results of melting are shown in Table 9. The yield of melting was 98.5%. The concentration of fluoride impurity was 350 ppm. At the end of melting, unmelted NdF$_3$ particles segregating on the crucible interior wall were found, and the crucible interior wall was found to be eroded due to reaction with fluoride.

TABLE 9

| Scrap added (%) | Flux's average particle size (μm) | Yield (%) | Nd (%) | Dy (%) | Al (%) | F (ppm) |
|---|---|---|---|---|---|---|
| 5.0 | 500 | 98.5 | 25.8 | 1.42 | 0.21 | 350 |

Using the ingot, a permanent magnet block was prepared as in Example 1. The magnet was measured for magnetic properties, finding a coercive force lowering of 500 Oe.

The sintered magnet was shaped and cut to a desired shape and plated with Ni. It was subjected to a corrosion resistance test in which much red rust generated from pinholes.

In the first embodiment of the invention, all the elements contained in the rare earth magnet scrap and/or sludge can be simultaneously recycled. Since better separation is established between the slag generated upon melting and the molten metal, the ingot is obtained from the melt in a high yield. The method is simple as compared with the prior art methods, is economically operative, and is of great worth in the industry.

In the second embodiment of the invention, when the flux, which is indispensable to improve the rate of recovery is added during the remelting of the rare earth magnet scrap and/or sludge, the contamination of the furnace chamber and the ingot with the flux is minimized. A magnet-forming alloy of quality is produced.

Japanese Patent Application Nos. 2001-209203 and 2001-209207 are incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A process of preparing a sintered rare earth magnet comprising the steps of:
    charging a melting furnace crucible with a rare earth-free magnet-constituent metal feed;
    heating the metal feed for melting into a melt;
    adding to the melt a rare earth containing metal feed and 0.1 to 50% by weight based on the metal feeds of an R—Fe—B base rare earth magnet scrap and/or sludge wherein R is a rare earth element inclusive of yttrium;
    further adding 0.01 to 30% by weight based on the metal feeds of a particulate flux containing a halide of at least one metal selected from among alkali metals, alkaline earth metals and rare earth metals and having an average particle size of 1 to 50 μm;
    melting the resulting mixture; and
    crushing, comminuting, compacting in a magnetic field, and sintering the resulting alloy.

2. The process at claim 1, wherein the step of heating the metal feed for melting into a melt is conducted at a temperature of 1500 to 1800° C.

3. The process of claim 1, wherein the step of melting the resulting mixture is conducted at a temperature of 1500 to 1800° C.

4. A process of preparing a sintered rare earth magnet comprising the steps of:
    charging a melting, rare earth-free magnet-constituent metal feed;
    heating the metal feed for melting into a melt;
    adding to the melt a rare earth-containing metal feed and 0.1 to 50% by weight based on the metal feeds of an R—Fe—B base rare earth magnet scrap and/or sludge wherein R is a rare earth element inclusive of yttrium;
    wrapping a particulate flux containing a halide of at least one metal selected from among alkali metals, alkaline earth metals and rare earth metals and having an average particle size of 1 to 50 μm, within a magnet-constituent metal;
    further adding 0.01 to 30% by weight based on the metal feeds of the metal wrapped flux;
    melting the resulting mixture; and
    crushing comminuting, compacting in a magnetic held, and sintering the resulting alloy.

5. The process of claim 4, wherein the step of heating the metal feed for melting into a melt is conducted at a temperature of 1500 to 1800° C.

6. The Process of claim 4, wherein the step of melting the resulting mixture is conducted at a temperature of 1500 to 1800° C.

* * * * *